United States Patent
Zhong et al.

(10) Patent No.: US 12,528,059 B2
(45) Date of Patent: Jan. 20, 2026

(54) MIXING SYSTEM AND MIXING METHOD

(71) Applicant: YANTAI JEREH PETROLEUM EQUIPMENT & TECHNOLOGIES CO., LTD., Shandong (CN)

(72) Inventors: Jifeng Zhong, Shandong (CN); Liang Lv, Shandong (CN); Kun Zhang, Shandong (CN); Chuanbo Wang, Shandong (CN); Yipeng Wu, Shandong (CN); Chunqiang Lan, Shandong (CN)

(73) Assignee: YANTAI JEREH PETROLEUM EQUIPMENT & TECHNOLOGIES CO., LTD., Shandong (CN)

( * ) Notice: Subject to any disclaimer, the term of this patent is extended or adjusted under 35 U.S.C. 154(b) by 871 days.

(21) Appl. No.: 17/698,892

(22) Filed: Mar. 18, 2022

(65) Prior Publication Data
US 2023/0085124 A1    Mar. 16, 2023

(30) Foreign Application Priority Data

Sep. 15, 2021   (CN) .......................... 202111082388.0
Sep. 15, 2021   (CN) .......................... 202122233060.6

(51) Int. Cl.
*B01F 25/00*   (2022.01)
*B01F 23/50*   (2022.01)
(Continued)

(52) U.S. Cl.
CPC ............ *B01F 25/12* (2022.01); *B01F 23/511* (2022.01); *B01F 23/59* (2022.01); *B01F 25/60* (2022.01);
(Continued)

(58) Field of Classification Search
CPC ...... B01F 25/12; B01F 35/2213; B01F 23/59; B01F 35/2211
See application file for complete search history.

(56) References Cited

U.S. PATENT DOCUMENTS

| 3,339,897 A | 9/1967 | Davis, Jr. |
| 4,453,829 A | 6/1984 | Althouse, III |
| (Continued) | | |

FOREIGN PATENT DOCUMENTS

| CN | 2170241 Y | 6/1994 |
| CN | 2653117 Y | 11/2004 |
| (Continued) | | |

OTHER PUBLICATIONS

Tai, Guang-feng et al.; "Study on an Intelligent Control System of the Sand Conveyance Device for Factory Fracturing"; China Academic Journal Electronic Publishing House Mining & Metallurgy, vol. 24, No. 5; Oct. 2015; pp. 67-61.

(Continued)

*Primary Examiner* — Anshu Bhatia
(74) *Attorney, Agent, or Firm* — Gang Chen; Crowell & Moring LLP

(57) ABSTRACT

A mixing system and a mixing method are provided. The mixing system includes a main pump and at least one mixing apparatus. Each mixing apparatus includes a main pipeline, a premixing device and a shearing-mixing device. The main pipeline has a liquid inlet end communicated with the main pump and is configured to convey main liquid, and the main pipeline includes a first liquid outlet end and a second liquid outlet end. The premixing device has an input end communicated with the first liquid outlet end and is configured to premix the main liquid with powder to obtain premixed liquid. The shearing-mixing device is communicated with an output end of the premixing device to obtain the premixed liquid, and is provided with a first shearing-mixing liquid inlet communicated with the second liquid outlet end to obtain the main liquid, so that mixed liquid is obtained.

19 Claims, 8 Drawing Sheets

(51) Int. Cl.
*B01F 25/60* (2022.01)
*B01F 25/72* (2022.01)
*B01F 27/90* (2022.01)
*B01F 35/221* (2022.01)

(52) U.S. Cl.
CPC .............. *B01F 25/72* (2022.01); *B01F 27/90* (2022.01); *B01F 35/2211* (2022.01); *B01F 35/2213* (2022.01)

(56) References Cited

U.S. PATENT DOCUMENTS

| | | | |
|---|---|---|---|
| 4,460,276 | A | 7/1984 | Arribau |
| 6,193,402 | B1 | 2/2001 | Grimland |
| 9,022,120 | B2 | 5/2015 | Zamora et al. |
| 9,328,599 | B2 | 5/2016 | Pich et al. |
| 9,375,691 | B2 | 6/2016 | Stegemoeller et al. |
| 9,833,756 | B2 | 12/2017 | Stoppler |
| 2006/0107998 | A1* | 5/2006 | Kholy .............. B01F 25/3121 137/3 |
| 2014/0069650 | A1 | 3/2014 | Stegemoeller |
| 2015/0238912 | A1* | 8/2015 | Luharuka ............. B01F 25/85 366/182.2 |
| 2015/0284194 | A1 | 10/2015 | Oren et al. |
| 2016/0047184 | A1 | 2/2016 | Luharuka |
| 2016/0216171 | A1 | 7/2016 | Moakler |
| 2016/0320347 | A1 | 11/2016 | Moakler |
| 2020/0149556 | A1 | 5/2020 | Judge |

FOREIGN PATENT DOCUMENTS

| | | |
|---|---|---|
| CN | 202322712 U | 7/2012 |
| CN | 102806027 A | 12/2012 |
| CN | 103145315 A | 6/2013 |
| CN | 103193160 A | 7/2013 |
| CN | 203066935 U | 7/2013 |
| CN | 103381339 A | 11/2013 |
| CN | 103640981 A | 3/2014 |
| CN | 103958039 A | 7/2014 |
| CN | 203899476 U | 10/2014 |
| CN | 104147953 A | 11/2014 |
| CN | 104741012 A | 7/2015 |
| CN | 204447897 U | 7/2015 |
| CN | 105251403 A | 1/2016 |
| CN | 105854559 A | 8/2016 |
| CN | 205850752 U | 1/2017 |
| CN | 206045899 U | 3/2017 |
| CN | 103628852 B | 5/2017 |
| CN | 106774107 A | 5/2017 |
| CN | 107159046 A | 9/2017 |
| CN | 206661107 U | 11/2017 |
| CN | 206735275 U | 12/2017 |
| CN | 206935166 U | 1/2018 |
| CN | 107902427 A | 4/2018 |
| CN | 207169595 U | 4/2018 |
| CN | 207497930 U | 6/2018 |
| CN | 207652980 A | 7/2018 |
| CN | 108371894 A | 8/2018 |
| CN | 208086829 U | 11/2018 |
| CN | 107381380 B | 12/2018 |
| CN | 208260574 U | 12/2018 |
| CN | 208500947 U | 2/2019 |
| CN | 109399459 A | 3/2019 |
| CN | 109879079 A | 6/2019 |
| CN | 208934678 U | 6/2019 |
| CN | 109985549 A | 7/2019 |
| CN | 110077965 A | 8/2019 |
| CN | 209476032 U | 10/2019 |
| CN | 110482250 A | 11/2019 |
| CN | 110989603 A | 4/2020 |
| CN | 111005710 A | 4/2020 |
| CN | 210655305 U | 6/2020 |
| CN | 111361955 A | 7/2020 |
| CN | 211190074 U | 8/2020 |
| CN | 211225549 U | 8/2020 |
| CN | 211384571 U | 9/2020 |
| CN | 211448645 U | 9/2020 |
| CN | 211636063 U | 10/2020 |
| CN | 110371856 B | 11/2020 |
| CN | 112279107 A | 1/2021 |
| CN | 112373864 A | 2/2021 |
| CN | 112389950 A | 2/2021 |
| CN | 113385091 A | 9/2021 |
| CN | 113428616 A | 9/2021 |
| DE | 102015218686 A1 | 3/2017 |
| JP | 2005-205407 A | 8/2005 |
| JP | 107774144 A | 3/2018 |
| KR | 20140080709 A | 7/2014 |
| WO | WO 2021/012831 A1 | 1/2021 |

OTHER PUBLICATIONS

Liao et al., "Progress of researches and applications for high shear mixers" Chemical Industry and Engineering Progress, 2019 38(3), pp. 1160-1175.
US Office Action, Aug. 29, 2024, pp. 1-8, issued in U.S. Appl. No. 18/515,541, USPTO, Alexandria, Virginia.
Liao et al.; "Progress of researches and applications for high shear mixers"; Chemical Industry and Engineering Progress, 38(3); 2019; pp. 1160-1175.
Office Action dated May 21, 2025 for Chinese Patent Application No. 202110870733.0 (8 pages).

* cited by examiner

MIXING SYSTEM AND MIXING METHOD

For all purposes, the present application claims the priority of Chinese patent application No. 202111082388.0 and Chinese utility model application No. 202122233060.6, which were filed on Sep. 15, 2021. The disclosures of the above Chinese applications are hereby incorporated in their entirety as a part of this application.

TECHNICAL FIELD

The present disclosure relates to a mixing system and a mixing method.

BACKGROUND

Fracturing technology refers to a method of forming fractures in oil and gas reservoirs under an action of liquid pressure during oil or gas production. The specific operation of fracturing is as follows: based on a principle of liquid pressure transmission, a pump with high-pressure and large-displacement is used to inject liquid (i.e., fracturing fluid) with a certain viscosity into the reservoir at a pressure greater than an absorption capacity of the reservoir, and then a sand-filled fracture with a certain geometric size and high flow conductivity is formed in the stratum near a bottom of a well, so that the production of the well can be increased.

In the prior art, fracturing fluid is prepared by mixing base fluid with at least one of guanidine rubber powder, polymer, polyacrylamide powder and cellulose in a mixing device. The mixing device includes a feed inlet, a liquid inlet and a discharge outlet, wherein the feed inlet is a channel for guanidine rubber powder to enter, and the liquid inlet is a channel for the base liquid to enter. The guanidine rubber powder and the base fluid enter a single mixing device at the same time, and then are mixed in an inner cavity of the mixing device. After the mixing is completed, the obtained fracturing fluid is discharged from the discharge outlet.

However, the fracturing fluid prepared by a mixing device is often mixed unevenly, which results in that the fracturing fluid often appears powder agglomeration (commonly known as fisheye). These agglomerations not only weaken the permeability of the fracturing fluid, but also reduce the viscosity of the fracturing fluid, which seriously affects the fracturing treatment effect of oil and gas wells. Therefore, how to improve mixing quality of the fracturing fluid and improve the fracturing treatment effect of oil and gas wells is an urgent problem to be solved by those skilled in the art.

SUMMARY

At least one embodiment of the present disclosure provides a mixing system including a main pump and at least one mixing apparatus. Each of the at least one mixing apparatus includes a main pipeline, a premixing device and a shearing-mixing device. The main pipeline has a liquid inlet end communicated with the main pump and is configured to convey main liquid, and the main pipeline includes a first liquid outlet end and a second liquid outlet end. The premixing device has an input end communicated with the first liquid outlet end of the main pipeline and is configured to premix the main liquid as obtained with powder as obtained to obtain premixed liquid. The shearing-mixing device is communicated with an output end of the premixing device to obtain the premixed liquid, and is provided with a first shearing-mixing liquid inlet communicated with the second liquid outlet end of the main pipeline to obtain the main liquid, so that mixed liquid is obtained by a shearing-mixing process.

For example, in the mixing system provided by at least one embodiment of the present disclosure, the shearing-mixing device further includes an impeller shearing assembly, and the impeller shearing assembly includes a rotating shaft and at least one shearing impeller driven by the rotating shaft.

For example, in the mixing system provided by at least one embodiment of the present disclosure, a liquid outlet direction of the second liquid outlet end is located on a plane perpendicular to an axial direction of the rotating shaft.

For example, in the mixing system provided by at least one embodiment of the present disclosure, the shearing-mixing device includes a second shearing-mixing liquid inlet configured to obtain the premixed liquid, and a liquid inlet direction of the second shearing-mixing liquid inlet is parallel to the axial direction of the rotating shaft; and a liquid inlet direction of the first shearing-mixing liquid inlet is located on the plane perpendicular to the axial direction of the rotating shaft.

For example, in the mixing system provided by at least one embodiment of the present disclosure, one or more first shearing-mixing liquid inlets are provided.

For example, in the mixing system provided by at least one embodiment of the present disclosure, a liquid outlet direction of the second liquid outlet end is parallel to an axial direction of the rotating shaft.

For example, in the mixing system provided by at least one embodiment of the present disclosure, the first shearing-mixing liquid inlet is communicated with an output end of the premixing device, and a liquid inlet direction of the first shearing-mixing liquid inlet is parallel to the axial direction of the rotating shaft.

For example, in the mixing system provided by at least one embodiment of the present disclosure, the at least one shearing impeller includes a first shearing impeller and a second shearing impeller, and the first shearing impeller and the second shearing impeller are arranged coaxially with the rotating shaft, respectively.

For example, in the mixing system provided by at least one embodiment of the present disclosure, a periphery of the first shearing impeller is provided with a first stator, and the first stator is provided with an opening; and/or, a periphery of the second shearing impeller is provided with a second stator, and the second stator is provided with an opening.

For example, in the mixing system provided by at least one embodiment of the present disclosure, the shearing-mixing device further includes an impeller shearing assembly of conveying type, which has an output pressure greater than 0.04 Mpa.

For example, in the mixing system provided by at least one embodiment of the present disclosure, the mixing apparatus further includes a control system, and the main pipeline is provided with a first pressure sensor configured to monitor a pressure of the main pipeline; and the control system is signally connected to the first pressure sensor and is configured to obtain a pressure signal of the first pressure sensor.

For example, in the mixing system provided by at least one embodiment of the present disclosure, the main pipeline is provided with a first flowmeter, and the control system is further signally connected to the first flowmeter and is configured to obtain a flow signal of the first flowmeter.

For example, in the mixing system provided by at least one embodiment of the present disclosure, the input end of the premixing device includes one or more premixing inlets, and the main pipeline is provided with a first flow control valve at one side close to the input end of the premixing device.

For example, in the mixing system provided by at least one embodiment of the present disclosure, the mixing apparatus further includes a mixed-liquid conveying pipeline, a remixing device and a branch pipeline; an input end of the mixed-liquid conveying pipeline is communicated with a shearing-mixing output port of the shearing-mixing device to convey the mixed liquid output from the shearing-mixing output port; an output end of the mixed-liquid conveying pipeline is communicated with an input end of the remixing device; and an input end of the branch pipeline is communicated with a third liquid outlet end of the main pipeline, and an output end of the branch pipeline is communicated with the input end of the remixing device.

For example, in the mixing system provided by at least one embodiment of the present disclosure, the branch pipeline is provided with a second flow control valve.

For example, in the mixing system provided by at least one embodiment of the present disclosure, the mixing apparatus further includes a spraying-mixing device, and the spraying-mixing device includes a spraying input end, a drainage input end and a spraying output end; the spraying input end is communicated with the output end of the branch pipeline, and the spraying output end is communicated with the input end of the remixing device, so that the output end of the branch pipeline is communicated with the input end of the remixing device; the drainage input end is communicated with the output end of the mixed-liquid conveying pipeline, and the spraying output end is communicated with the input end of the remixing device, so that the output end of the mixed-liquid conveying pipeline is communicated with the input end of the remixing device; and the spraying input end is configured to obtain the main liquid, and the drainage input end is configured to obtain the mixed liquid, so that the mixed liquid and the main liquid are mixed inside the spraying-mixing device.

For example, in the mixing system provided by at least one embodiment of the present disclosure, a flow area of the spraying-mixing device is fixed, or, a flow area of the spraying-mixing device is variable.

For example, the mixing system provided by at least one embodiment of the present disclosure further includes a main mixing tank, a main liquid branch pipeline, and a manifold communicated with the main pump; the at least one mixing apparatus includes a plurality of mixing apparatuses, and the liquid inlet end of the main pipeline of each of the plurality of mixing apparatuses is communicated with the main pump through the manifold; the plurality of mixing apparatuses are arranged in parallel between the manifold and the main mixing tank, and the main mixing tank is connected in series with the plurality of mixing apparatuses and the main liquid branch pipeline, respectively; the main liquid branch pipeline is arranged in parallel with the plurality of mixing apparatuses, and the main liquid branch pipeline is arranged between the manifold and the main mixing tank, and a liquid inlet end of the main liquid branch pipeline is communicated with the manifold to obtain the main liquid which is supplied by the main pump and flows through the manifold; and the main liquid branch pipeline includes at least one main liquid branch outlet end, and each of the at least one main liquid branch outlet end is merged with at least part of an intermediate pipeline communicating the main mixing tank and the shearing-mixing output port of at least one mixing apparatus of the plurality of mixing apparatuses.

For example, the mixing system provided by at least one embodiment of the present disclosure further includes a first merging device and a second merging device; the at least one main liquid branch outlet end includes a first main liquid branch outlet end, and the plurality of mixing apparatuses include two or more first mixing apparatuses; and the shearing-mixing output ports of the two or more first mixing apparatuses are communicated with different input ends of the first merging device, respectively, an output end of the first merging device and the first main liquid branch outlet end are communicated with different input ends of the second merging device, respectively, and an output end of the second merging device is communicated with an input end of the main mixing tank.

For example, the mixing system provided by at least one embodiment of the present disclosure further includes at least one third merging device; the at least one main liquid branch outlet end includes at least one second main liquid branch outlet end, and the plurality of mixing apparatuses include at least one second mixing apparatus; the at least one second main liquid branch outlet end is arranged in one-to-one correspondence with the at least one third merging device, and the at least one third merging device is arranged in one-to-one correspondence with the at least one second mixing apparatus; and the shearing-mixing output port of each of the at least one second mixing apparatus is communicated with one of different input ends of a corresponding third merging device, and an output end of each of the at least one third merging device is communicated with the input end of the main mixing tank.

For example, the mixing system provided by at least one embodiment of the present disclosure further includes a fourth merging device; the at least one third merging device includes two or more third merging devices, an output end of each of the two or more third merging devices is communicated with one of different input ends of the fourth merging device, and an output end of the fourth merging device is communicated with the input end of the main mixing tank.

At least one embodiment of the present disclosure further provides a mixing method based on the mixing system according to any of the above, including: starting the main pump and supplying the main liquid to the mixing apparatus through the liquid inlet end of the main pipeline; obtaining the powder and further obtaining the main liquid from the main pipeline, by the premixing device; premixing the main liquid with the powder to obtain the premixed liquid, by the premixing device; obtaining the premixed liquid from an output end of the premixing device, and obtaining the main liquid through the first shearing-mixing liquid inlet, by the shearing-mixing device; and obtaining mixed liquid through a shearing-mixing process and delivering the mixed liquid, by the shearing-mixing device.

BRIEF DESCRIPTION OF THE DRAWINGS

In order to describe embodiments of the disclosure or the technical solutions in the prior art more clearly, the drawings necessary for the embodiments or the description of the prior art will be briefly introduced below. Obviously, the drawings in the following description are only some embodiments of the disclosure, and for those skilled in the art, other drawings can be obtained according to these drawings without paying creative labor.

DETAILED DESCRIPTION

Figure 1:
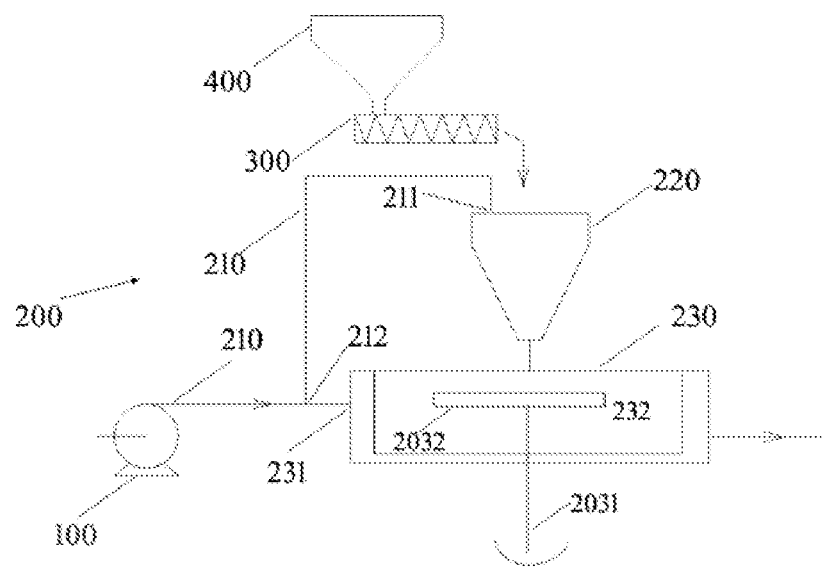
FIG. 1 is a schematic diagram of a mixing system provided by some embodiments of the present disclosure.

Hereinafter, the technical solutions of the embodiments of the disclosure will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiments, without any inventive work, which should be within the scope of the disclosure.

Unless otherwise defined, all terms used in the embodiments of this disclosure (including technical and scientific terms) have the same meanings as those commonly understood by those skilled in the art to which this disclosure belongs. It should also be understood that terms such as those defined in a general dictionary should be interpreted as having meanings consistent with their meanings in the context of related technologies, and should not be interpreted in an idealized or extremely formal sense unless the embodiments of the present disclosure explicitly define so.

The words "first", "second" and the like used in the embodiments of this disclosure do not indicate any order, quantity or importance, but are only used to distinguish different components. Similar words such as "a", "an" or "the" do not mean quantity limitation, but mean that there exists at least one. Likewise, similar words such as "including" or "comprising" mean that the elements or objects appearing before the word cover the listed elements or objects appearing after the word and their equivalents, but do not exclude other elements or objects. Similar words such as "connected" or "connecting" are not limited to physical or mechanical connection, but can include electrical connection, whether direct or indirect. A flowchart is used in the disclosed embodiment to illustrate the steps of the method according to the disclosed embodiment. It should be understood that the preceding or following steps are not necessarily performed accurately in sequence. On the contrary, the various steps can be processed in reverse order or simultaneously. At the same time, other operations can also be added to these procedures, or, one or more steps can be removed from these procedures.

At present, water and powder are mostly mixed by a jetting method and a stirring-shearing method. For easy-to-mix powder, such as sugar or salt powder, it can be quickly mixed. However, it usually involves many problems when a material difficult to mix is used.

In the existing solution, a jet mixer is used to complete the mixing of water and powder. When some jet mixers are used, a water supply pressure needs to be high enough and kept constant, so that the jet mixers can work normally. Moreover, it is easy to introduce a large amount of air in the case of the jet mixers. Under some working conditions, the introduction of air will lead to a generation of foams, and it will also have adverse effects on chemicals, for example, an oxidation reaction may occur. In addition, the jet flow depends on the water supply pressure. When the water supply pressure fluctuates, it is easy to affect the stability of the liquid supply of the jet mixer, resulting in the instability of a jet flow velocity and affecting the mixing effect of powder and liquid.

Inventors of the present disclosure found that during operations such as polymer flooding and fracturing stimulation in oil fields, it is necessary to mix polyacrylamide polymer with water to form working fluid, and the colloidal liquid formed by mixing is used for displacement, stimulation and replacement of oil resource and gas resource. A core component required in the above operation process is a mixer that can mix water and powder to form uniform solution. There are three difficulties in the above operation process: (i) forming uniform solution without producing "powder in water"; (ii) reducing the introduction of air, thereby reducing the impact of foam acting on the operation, especially the impact of oxygen in air acting on the polyacrylamide solution; (iii) improving the degree of combination of water and powder, thereby reducing the use of powder.

The mixer involves some problems in solving the above difficulties. Firstly, the uniform solution can be formed in most cases, but it cannot be guaranteed to be 100% free of fisheye under any circumstances. For example, in the case of powder hanging, it is easy to cause problems such as mixer failure and powder agglomeration when powder blocks fall into the mixer. Secondly, a large amount of air will inevitably be introduced in the jetting process, and the generated foams will have adverse effects on conveyance, liquid level control and the like and will cause harmful effects such as oxidative degradation of the polyacrylamide solution, etc. Thirdly, problems such as poor stability of the jet mixer and water pressure fluctuation have a great influence on the using effect, which may lead to the problem of low bonding degree between powder and water and easily result in waste of powder. Therefore, the inventors of the present disclosure found that, for example, for fracturing stimulation operations, a shearing-mixing system generally has advantages over the jet mixer in terms of the above three difficult problems.

Inventors of the present disclosure also found that a common stirring-shearing device, such as an existing shearing pump, usually has only one liquid inlet and the liquid inlet is only used to obtain required liquid to be mixed.

Under the condition that the powder as used has high adhesion and is easy to agglomerate and adhere, it is liable to cause problems such as accumulation, agglomeration, adhesion, etc., and the liquid preparation process cannot be completed well.

Inventors of the present disclosure also found that the existing shearing pump has weak discharge capacity, and there is no shearing pump mainly functioning for conveying, so it is easy to cause the problem that the mixed liquid cannot be discharged to the outside in time when the water flow is high. Moreover, under the condition that the powder as used has high adhesion and is easy to agglomerate and adhere, it is liable to cause problems such as accumulation, agglomeration, adhesion, etc., so that the liquid preparation process cannot be well completed.

At least one embodiment of the present disclosure provides a mixing system including a main pump and at least one mixing apparatus. Each of the at least one mixing apparatus includes a main pipeline, a premixing device and a shearing-mixing device respectively. A liquid inlet end of the main pipeline is communicated with the main pump and the main pipeline is configured to convey main liquid, and the main pipeline includes a first liquid outlet end and a second liquid outlet end. An input end of the premixing device is communicated with the first liquid outlet end of the main pipeline, and the premixing device is configured to premix obtained main liquid with obtained powder to obtain premixed liquid. The shearing-mixing device is communicated with an output end of the premixing device to obtain the premixed liquid, and the shearing-mixing device is provided with a first shearing-mixing liquid inlet communicated with the second liquid outlet end of the main pipeline to obtain the main liquid, so that mixed liquid is obtained by a shearing-mixing process.

The mixing system of the above embodiment of the present disclosure adopts the premixing device for premixing before mixing by the shearing-mixing device, which improves the mixing effect of powder and liquid. The shearing-mixing device can not only obtain the premixed liquid output by the premixing device for further mixing, but also directly obtain the main liquid circulating in the main pipeline which can be used for other purposes. For example, it can better flush an internal structure of the shearing-mixing device to prevent from adhesion, and also increase the liquid volume, reduce the liquid concentration and increase the liquid fluidity. For example, it is also beneficial for an impeller in the shearing-mixing device to be more immersed in the liquid, thus reducing the contact between the impeller and the air, and further reducing the occurrence of cavitation, so as to better complete the liquid preparing process.

Hereinafter, embodiments of the present disclosure and examples thereof will be described in detail with reference to the accompanying drawings.

FIG. 1 is a schematic diagram of a mixing system provided by some embodiments of the present disclosure.

For example, as shown in FIG. 1, the mixing system provided by at least one embodiment of the present disclosure includes a main pump 100 (the main pump 100 can be regarded as a main liquid supply part or a base liquid supply part) and at least one mixing apparatus 200 (only one mixing apparatus is shown as an example in FIG. 1). Each of the at least one mixing apparatus 200 includes a main pipeline 210, a premixing device 220 and a shearing-mixing device 230.

For example, in the example of FIG. 1, a liquid inlet end of the main pipeline 210 is communicated with the main pump 100, and the main pipeline 210 is configured to convey main liquid (which can also be referred to as base liquid). The main pipeline 210 includes a first liquid outlet end 211 and a second liquid outlet end 212. An input end of the premixing device 220 is communicated with the first liquid outlet end 211 of the main pipeline 210, and the premixing device 220 is configured to premix obtained main liquid and obtained powder to obtain premixed liquid. The shearing-mixing device 230 is communicated with an output end of the premixing device 220 to obtain the premixed liquid, and the shearing-mixing device 230 is provided with a first shearing-mixing liquid inlet 231 communicated with the second liquid outlet end 212 of the main pipeline 210 to obtain the main liquid, so that mixed liquid is obtained by a shearing-mixing process.

It should be noted that FIG. 1 is only a simple and intuitive schematic drawing for readers to understand, and is not a limitation of the embodiments of the present disclosure.

For example, the first shearing-mixing liquid inlet 231 shown in FIG. 1 is only a schematic illustration, which represents an opening at any position on the shearing-mixing device 230 that communicates with the second liquid outlet end 212 of the main pipeline 210, and the position where the output end of the premixing device 220 communicates with the shearing-mixing device 230 in FIG. 1 is only a schematic illustration, which is not a limitation of the embodiment of the present disclosure. FIGS. 2 to 5 below respectively show schematic diagrams of specific embodiments of the present disclosure. In these embodiments, structures of the shearing-mixing device 230, the premixing device 220, the main pipeline 210, etc. of the present disclosure are illustrated with specific exemplary designs.

It should also be noted that the arrangement and placement of pipelines of the mixing system according to the embodiments of the present disclosure in all drawings are only schematic illustrations, and are not the arrangement and placement in actual solutions and applications, which is not intended to cause any limitation to the present disclosure.

For example, as shown in FIG. 1, the mixing apparatus 200 includes a storage device 400 and a conveyor 300. The storage device 400 is configured to store powder. The conveyor 300 is configured to convey the powder from the storage device 400 to the premixing device 220.

For example, as shown in FIG. 1, the shearing-mixing device 230 further includes an impeller shearing assembly 232. The impeller shearing assembly 232 includes a rotating shaft 2031 and at least one shearing impeller 2032 driven by the rotating shaft 2031 (only one shearing impeller is shown as an example in FIG. 1).

Figure 2:
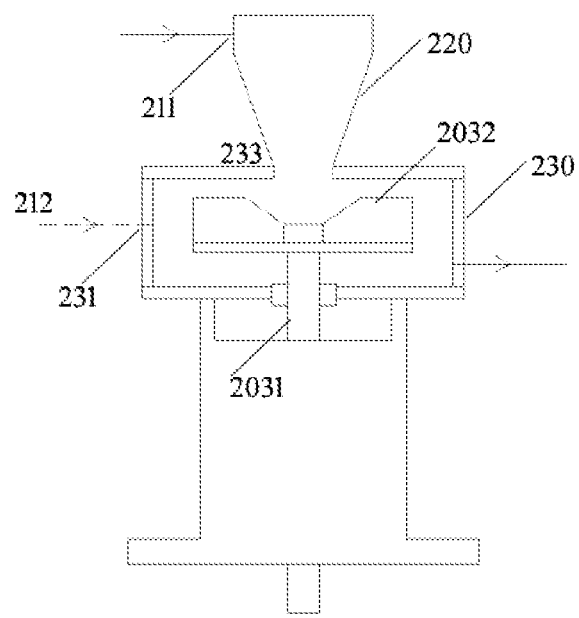
FIG. 2 is a partial schematic diagram of a shearing-mixing device provided by some embodiments of the present disclosure.

FIG. 2 is a partial schematic diagram of a shearing-mixing device provided by some embodiments of the present disclosure.

For example, as shown in FIG. 2, a liquid outlet direction of the second liquid outlet end 212 is located on a plane perpendicular to an axial direction of the rotating shaft 2031. For example, in the example of FIG. 2, the shearing-mixing device 230 includes a second shearing-mixing liquid inlet 233 and the second shearing-mixing liquid inlet 233 is configured to obtain the premixed liquid, and a liquid inlet direction of the second shearing-mixing liquid inlet 233 is parallel to the axial direction of the rotating shaft 2031. A liquid inlet direction of the first shearing-mixing liquid inlet 231 is located on a plane perpendicular to the axial direction of the rotating shaft 2031.

For example, as shown in FIG. 2, the number of the first shearing-mixing liquid inlet 231 may be one or more, which may be determined according to an actual situation, and the present disclosure is not limited to this.

For example, as shown in FIG. 2, when the number of the first shearing-mixing liquid inlet 231 is more than one, a plurality of first shearing-mixing liquid inlets 231 may be arranged along a circumferential direction of a shell of the shearing-mixing device 230. This is only an example, and is not a limitation of the present disclosure, as long as the first shearing-mixing liquid inlet 231 can obtain the main liquid provided by the second liquid outlet end 212 of the main pipeline 210 without exhaustively detailed here.

For example, in the example of FIG. 2, the first shearing-mixing liquid inlet 231 can be used as an auxiliary liquid inlet, which can not only flush the impeller shearing assembly 232 inside the shearing-mixing device 230 to prevent from adhesion, but also increase the liquid volume, reduce the liquid concentration, dilute the mixed liquid and increase the liquid fluidity.

It should be noted that in the above embodiments of the present disclosure, the first shearing-mixing liquid inlet and the second shearing-mixing liquid inlet are intended to distinguish two shearing-mixing liquid inlets, rather than limiting the two shearing-mixing liquid inlets themselves.

Figure 3:
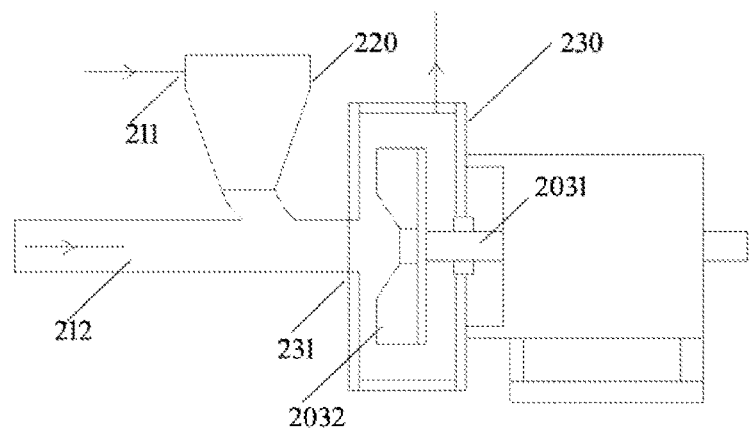
FIG. 3 is a partial schematic diagram of a shearing-mixing device provided by some other embodiments of the present disclosure.

FIG. 3 is a partial schematic diagram of a shearing-mixing device provided by some other embodiments of the present disclosure.

For example, as shown in FIG. 3, a liquid outlet direction of the second liquid outlet end 212 is parallel to an axial direction of the rotating shaft 2031. For example, as shown in FIG. 3, the first shearing-mixing liquid inlet 231 is communicated with an output end of the premixing device 220, and a liquid inlet direction of the first shearing-mixing liquid inlet 231 is parallel to the axial direction of the rotating shaft 2031.

For example, compared with the example of FIG. 2, in the example of FIG. 3, a relative position of the premixing device 220 and the shearing impeller 2032 can be changed, so that the shearing impeller 2032 is more immersed in the liquid in the shearing-mixing device 230 or completely immersed in the liquid in the shearing-mixing device 230, and the contact between the impeller 2032 and the air is reduced, thereby reducing the occurrence of cavitation.

It should be noted that a communication involved in some embodiments of the present disclosure means that a connection relationship between two components allows the corresponding liquid to circulate smoothly. For example, the two components can be directly connected or indirectly connected, or other intermediate parts may be arranged between them, or there may be a small interval between them, etc., which is not limited in the present disclosure as long as the liquid can be smoothly circulated, without particularly described here.

In some examples, the shearing-mixing device 230 further includes an impeller shearing assembly of conveying type that may have an output pressure greater than 0.04 Mpa. For example, the impeller shearing assembly of conveying type can adopt a dual-impeller shearing assembly to enhance an outward discharge effect, thereby forming a shearing-mixing device 230 mainly functioning for conveying, which can avoid problems such as easy adhesion, accumulation, agglomeration, and the like, and is beneficial to improving a mixing effect of powder and liquid. Of course, this is only an example, and the impeller shearing assembly of conveying type that has an output pressure greater than 0.04 Mpa is not limited to this dual-impeller shearing assembly, but may also be impeller shear assemblies of other structures and constructions without exhaustively detailed here.

Figure 4:
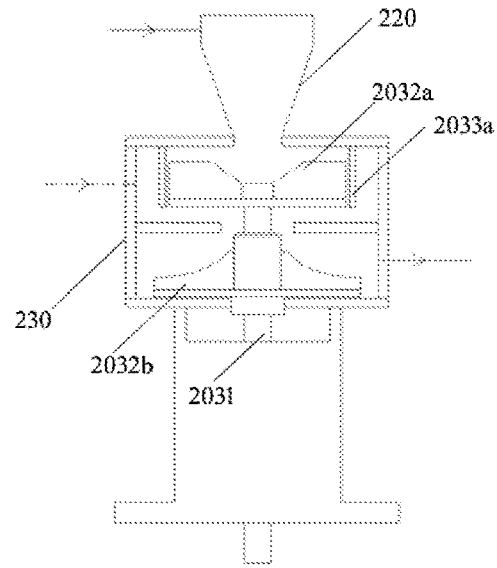
FIG. 4 is a partial schematic diagram of a dual-impeller shearing assembly provided by some embodiments of the present disclosure.
Figure 5:
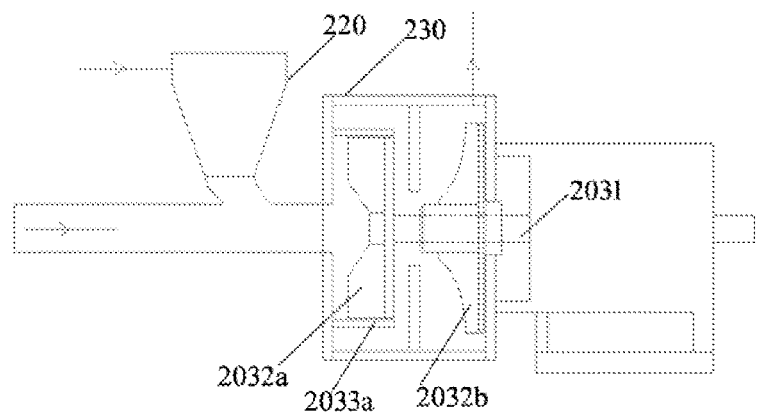
FIG. 5 is a partial schematic diagram of a dual-impeller shearing assembly provided by some other embodiments of the present disclosure.

FIG. 4 is a partial schematic diagram of a dual-impeller shearing assembly provided by some embodiments of the present disclosure. FIG. 5 is a partial schematic diagram of a dual-impeller shearing assembly provided by some other embodiments of the present disclosure.

For example, as shown in FIGS. 4 and 5, the at least one shearing impeller 2032 includes a first shearing impeller 2032a and a second shearing impeller 2032b, and the first shearing impeller 2032a and the second shearing impeller 2032b are arranged coaxially with the rotating shaft 2031, respectively. It can be seen that, the mixing effect of powder and liquid is improved by further mixing through the second shearing impeller 2032b after mixing through the first shearing impeller 2032a, and meanwhile the second shearing impeller 2032b can enhance the outward discharge effect.

For example, as shown in FIGS. 4 and 5, a periphery of the first shearing impeller 2032a is provided with a first stator 2033a, and the first stator 2033a is provided with an opening (such as one or more selected from the group consisted of mesh hole, strip hole, round hole, square hole and oblong hole). In this way, by an additional arrangement of the stator, a plurality of local turbulences can be formed, a shearing effect of powder solution can be improved, and functions of dissolution and dispersion can be further achieved, so that the liquid and the powder can be fully mixed.

In some examples, a periphery of the second shearing impeller 2032b may also be provided with a second stator (not shown) according to the actual need, and the second stator is provided with an opening (one or more selected from the group consisted of mesh hole, strip hole, round hole, square hole and oblong hole).

It should be noted that the impeller shearing assembly 232 of the shearing-mixing device 230 according to the above embodiments of the present disclosure is not limited to including one shearing impeller or two shearing impellers but may further include more than three shearing impellers, and the arrangement of each shearing impeller is not limited but can be flexibly adjusted according to actual application, without repeating here in the present disclosure.

Furthermore, it should be noted that the present disclosure does not limit the types of the stator arranged correspondingly to the first shearing impeller 2032a and/or the second shearing impeller 2032b. For example, the stator (e.g., the first stator and/or the second stator) may be single-layered, multi-layered, or in other reasonable types, which will not be particularly described here.

In some examples, the type of the first shearing impeller 2032a and/or the second shearing impeller 2032b is one or more of the following: a blade type, a tooth type, a blade-tooth combination type and a centrifugal impeller type. This is merely an example and is not a limitation of the present disclosure.

FIGS. 6 to 11 are schematic diagrams of a mixing system provided by some embodiments of the present disclosure.

Figure 6:
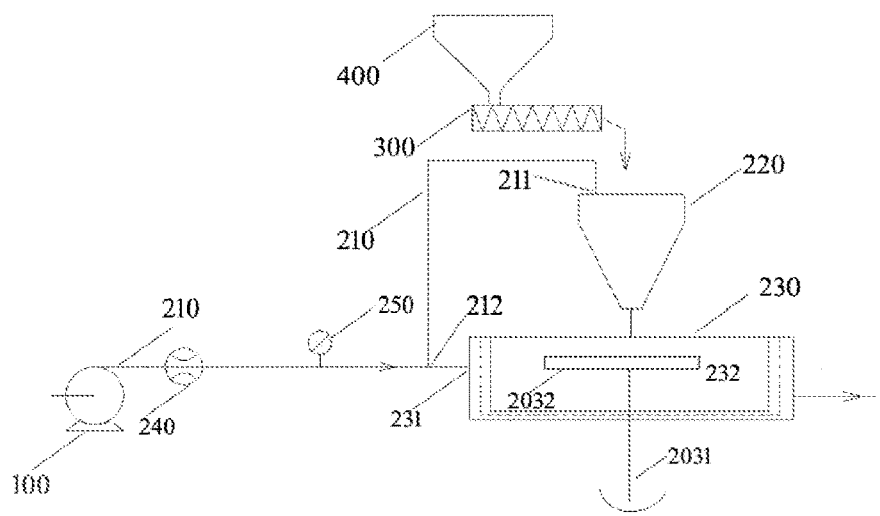
FIGS. 6 to 11 are schematic diagrams of a mixing system provided by some embodiments of the present disclosure.

For example, as shown in FIG. 6, the mixing apparatus further includes a control system (not shown), and the main pipeline 210 is provided with a pressure sensor 250 and the pressure sensor 250 is configured to monitor a pressure of the main pipeline 210. The control system is signally connected to the pressure sensor 250, and the control system is configured to obtain a pressure signal of the pressure sensor 250 to check a pressure of the main pipeline 210 and allow the liquid supply of the shearing-mixing device to be sufficient.

For example, the control system can preset a pressure value. By controlling a rotation speed of the main pump 100, etc., the pressure value measured by the pressure sensor 250 is within a preset allowable range, so that the liquid supply of the shearing-mixing device 230 is sufficient and close to a preset working condition.

For example, as shown in FIG. 6, the main pipeline 210 is also provided with a flowmeter 240, and the control system is also connected to the flowmeter 240 and is configured to obtain a flow signal of the flowmeter 240.

In some examples, the control system monitors a pressure and a flow of the fluid flowing through the pipeline by acquiring the pressure signal of the pressure sensor 250 and the flow signal of the flowmeter 240, and judges whether the pressure and flow of the fluid flowing through the pipeline meet requirements. And according to the requirements, an execution module of the control system is used to control the rotation speed of the main pump to ensure that the liquid entering the main pump has a certain flow velocity or flow rate, so as to avoid cavitation caused by insufficient liquid supply.

In some examples, the conveyor 300 may be a screw conveyor, a star conveyor, a ram or the like. This is merely an example and is not a limitation of the present disclosure.

According to some embodiments of the present disclosure, a sensor (another sensor different from the above-mentioned pressure sensor 250) can be provided to measure a rotation speed of the conveyor 300 or an opening degree of the conveyor 300. After corresponding information of the sensor is obtained through a detection by the control system, a powder-adding speed can be calculated according to a mixing ratio set by the control system and a flow rate actually measured by the flowmeter 240, and a corresponding conveyor actuator can be controlled to reach a corresponding rotation speed or an opening degree by combining a conveying efficiency coefficient, a density, a unit rotation speed or a conveying speed, so that an actual output amount of the powder is constantly close to a required, addition amount.

In some examples, a weight sensor (not shown) is provided in the storage device 400, and the weight sensor is configured to monitor a weight value of the powder in the storage device 400 in real time. The control system is signally connected to the weight sensor to obtain the weight value monitored by the weight sensor.

Figure 7:
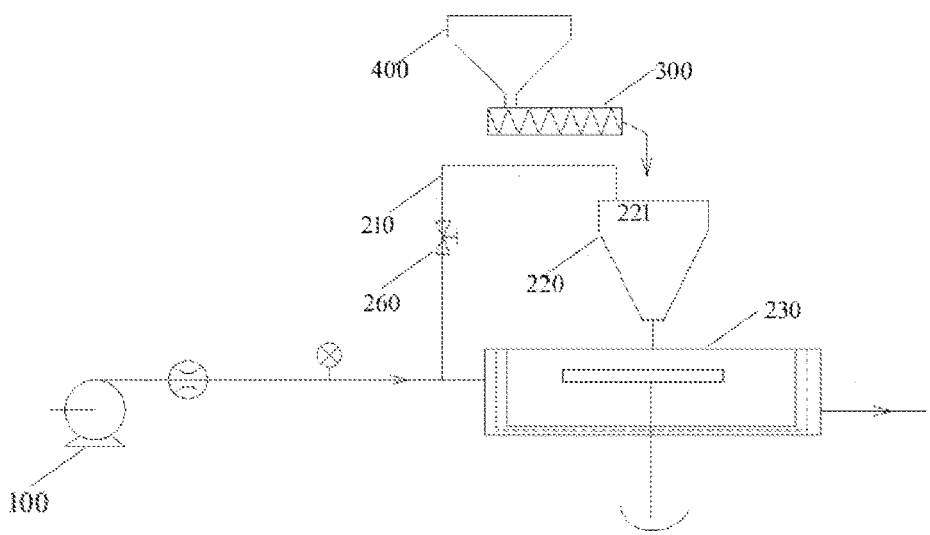

For example, as shown in FIG. 7, the main pipeline 210 is provided with a flow control valve 260 and the flow control valve 260 is located at one side close to the input end of the premixing device 220. The flow control valve 260 is configured to adjust the flow rate so that the inputted flow rate of the premixing device 220 is appropriate, thereby achieving a desired flowing effect.

Figure 8:
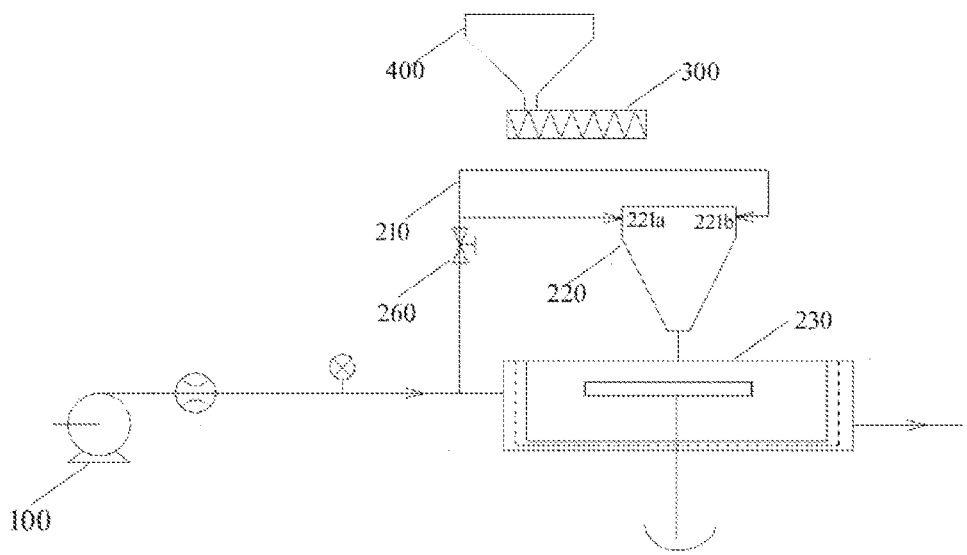

In some examples, the input end of the premixing device 220 includes a premixing inlet or a plurality of premixing inlets. For example, as shown in FIG. 7, the input end of the premixing device 220 includes a premixing inlet 221. For another example, as shown in FIG. 8, the input end of the premixing device 220 includes two premixing inlets, namely a premixing inlet 221a and a premixing inlet 221b. This is only an example, not a limitation of the present disclosure. The input end of the premixing device 220 of the present disclosure may further include three or more premixing liquid inlets. Moreover, the present disclosure does not limit a direction of liquid entering the premixing device 220 through the premixing liquid inlets, that is, a liquid outlet direction of the first liquid outlet end 211 is not limited, either. For example, the liquid outlet direction of the first liquid outlet end 211 may be at any angle with the axial direction of the rotating shaft 2031, or may be any direction on the plane perpendicular to the rotating shaft 2031. These aspects can be flexibly adjusted according to actual needs, without particularly described here.

Figure 9:
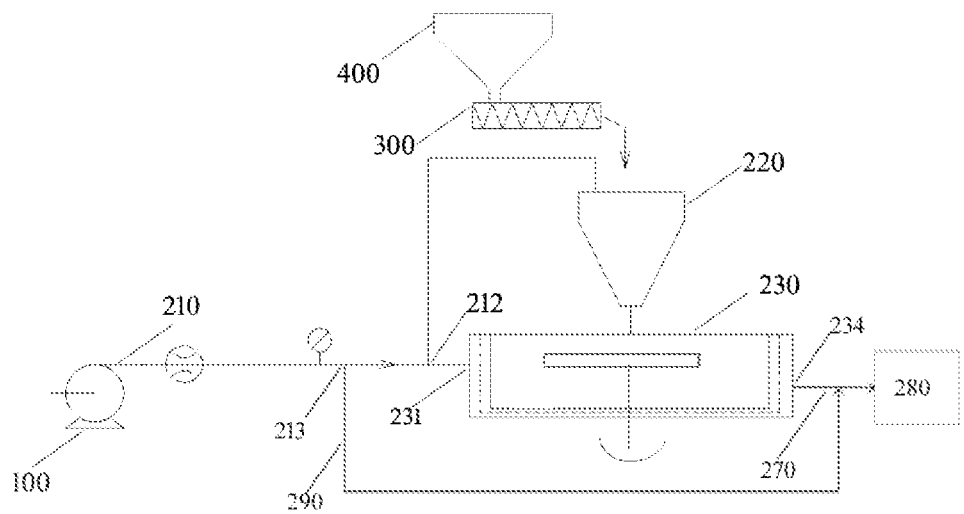

For example, as shown in FIG. 9, the mixing apparatus 200 further includes a mixed-liquid conveying pipeline 270, a remixing device 280 and a branch pipeline 290. An input end of the mixed-liquid conveying pipeline 270 is communicated with a shearing-mixing output port 234 of the shearing-mixing device 230 to convey the mixed liquid output from the shearing-mixing output port 234. An output end of the mixed-liquid conveying pipeline 270 is communicated with an input end of the remixing device 280. An input end of the branch pipeline 290 is communicated with a third liquid outlet end 213 of the main pipeline 210, and an output end of the branch pipeline 290 is communicated with the input end of the remixing device 280. Therefore, in some embodiments of the present disclosure, the branch pipeline 290 is added to increase an overall flow rate, and the remixing device 280 is used to realize further mixing, so that the liquid and powder can be fully mixed.

For example, in the example of FIG. 9, the main liquid in the branch pipeline 290 and the mixed liquid passing through the mixed-liquid conveying pipeline 270 are merged and then enter the remixing device 280 together.

In some examples, the remixing device 280 may be one or more selected from the group consisted of a three-way (e.g., Y-shaped or T-shaped) mixer, a static mixer, a jet mixer, a tubular cyclone mixer, a diffusion mixer, a mixing tank, and a coil-pipe typed mixing device arranged in parallel or in series. This is merely an example and is not a limitation of the present disclosure.

In some examples, the location where the main liquid of the branch pipeline 290 and the mixed liquid passing through the mixed-liquid conveying pipeline 270 are merged is provided with one or more selected from the group consisted of a three-way (e.g., Y-shaped or T-shaped) mixer, a static mixer, a jet mixer, a tubular cyclone mixer, a diffusion mixer, a mixing tank, and a coil-pipe typed mixing device arranged in parallel or in series. This is merely an example and is not a limitation of the present disclosure.

Figure 10:
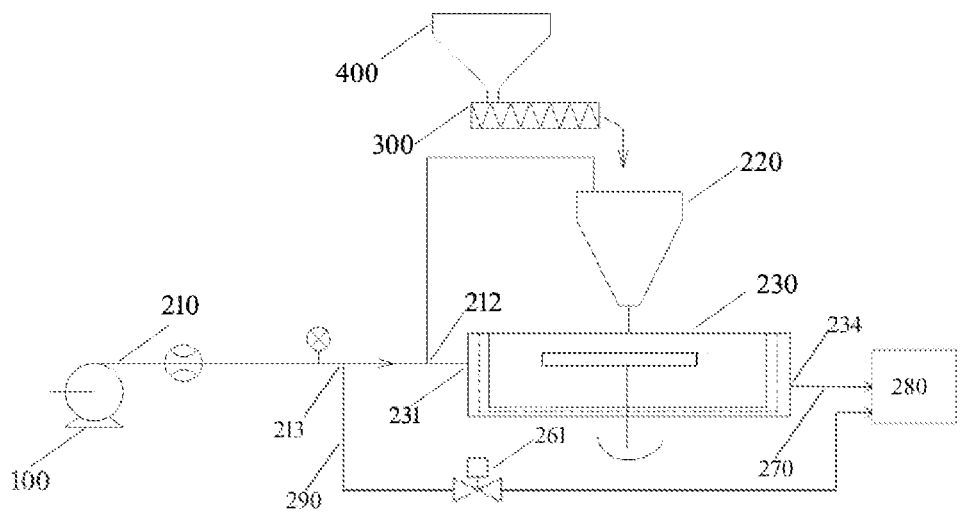

For example, as shown in FIG. 10, the branch pipeline 290 is provided with a flow control valve 261. According to some embodiments of the present disclosure, a flow rate of the branch pipeline 290 is adjusted by using the flow control valve 261 (for example, the flow rate is adjusted by adjusting an opening degree of the valve), and a proportion of powder is controlled by the rotation speed of the conveyor 300 to guarantee the ratio of liquid and powder, so that the main liquid flowing through the flow control valve 261 of the branch pipeline 290 and the mixed liquid output from the mixed-liquid conveying pipeline 270 enter the remixing device 280 together.

Figure 11:
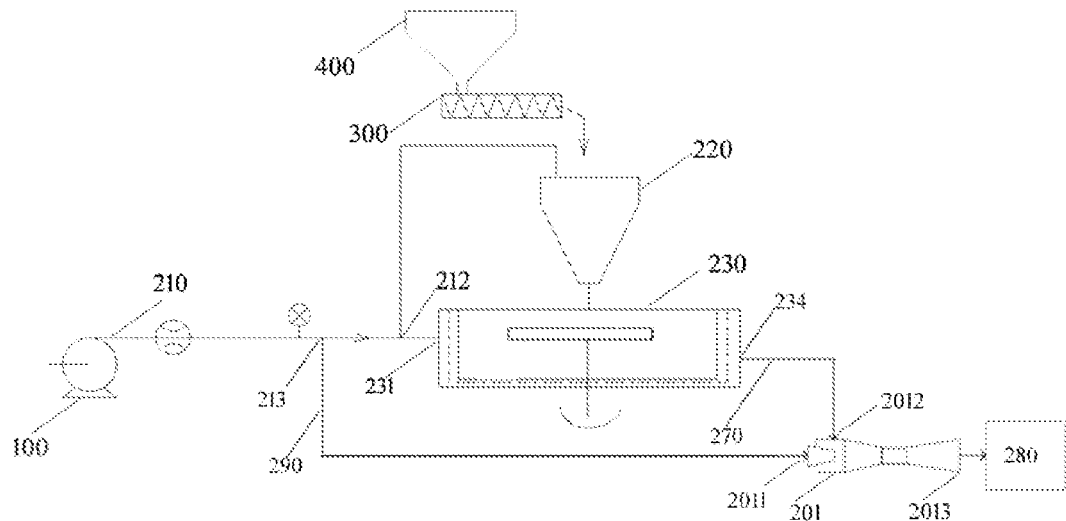

For example, as shown in FIG. 11, the mixing apparatus 200 further includes a spraying-mixing device 201, and the spraying-mixing device 201 includes a spraying input end 2011, a drainage input end 2012 and a spraying output end 2013.

For example, the spraying input end 2011 is communicated with the output end of the branch pipeline 290, and the spraying output end 2013 is communicated with the input end of the remixing device 280, so that the output end of the branch pipeline 290 is communicated with the input end of the remixing device 280. The drainage input end 2012 is communicated with the output end of the mixed-liquid conveying pipeline 270, and the spraying output end 2013 is communicated with the input end of the remixing device 280, so that the output end of the mixed-liquid conveying pipeline 270 is communicated with the input end of the remixing device 280. The spraying input end 2011 is configured to obtain the main liquid, and the drainage input end 2012 is configured to obtain the mixed liquid, so that the mixed liquid and the main liquid are mixed inside the spraying-mixing device 201.

In some examples, a flow area of the spraying-mixing device 201 is fixed. For example, when the spraying input end 2011 includes a nozzle pipeline with a fixed cross-section, the pressure sensor 250 on the main pipeline 210 and the control system are cooperated with the main pump 100 for speed regulation, so as to keep the cross-sectional area of the pipeline to be constant; in such case, the flow rate of the liquid flowing through the nozzle of the spraying input end 2011 is also constant.

In some other examples, a flow area of the spraying-mixing device 201 is variable. For example, the spraying-mixing device 201 includes a variable section pipeline and a flow regulating assembly, and the flow rate at an input end of the variable section pipeline is regulated by the flow regulating assembly. For example, the flow regulating assembly includes a movable member capable of reciprocating and a driving member capable of driving the movable member to move, and a conical surface of the movable member is arranged corresponding to a conical surface of the variable section pipeline to regulate the flow rate at the input end of the variable section pipeline. Therefore, the flow rate can be adjusted by adjusting the flow area of the spraying-mixing device 201, and the mixing of two streams of liquids within a certain flow rate range can be completed. In view of the fact that the specific type of the spraying-mixing device 201 with a variable flow area is not the focus of the present disclosure, any spraying-mixing device 201 with a variable flow area is within the protection scope of the present disclosure, and will not be described in detail here.

For example, in the examples shown in FIGS. 10 and 11, the remixing device 280 may also be one or more selected from the group consisted of a three-way (e.g., Y-shaped or T-shaped) mixer, a static mixer, a jet mixer, a tubular cyclone mixer, a diffusion mixer, a mixing tank, and a coil-pipe typed mixing device arranged in parallel or in series. This is merely an example and is not a limitation of the present disclosure.

Figure 12:
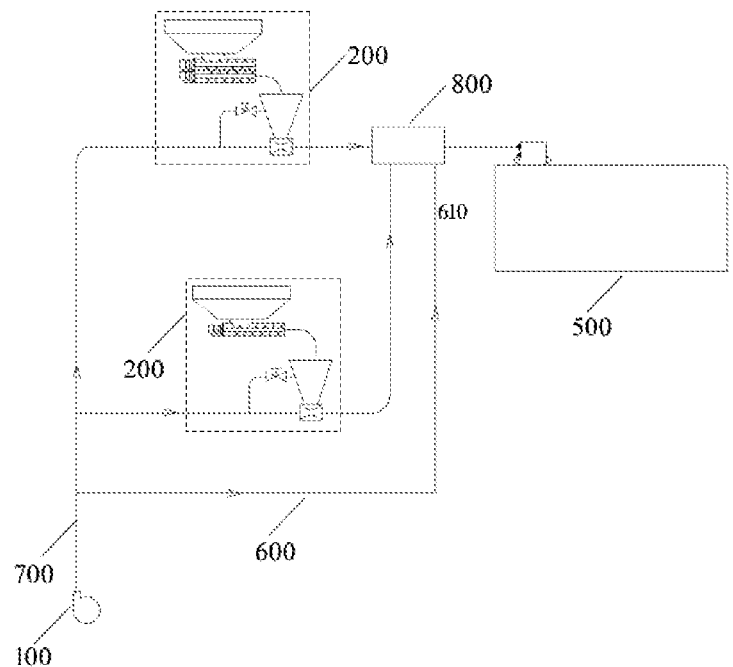
FIGS. 12 and 12A are layout diagrams of a mixing system including a plurality of mixing apparatuses provided by some embodiments of the present disclosure.
Figure 12A:
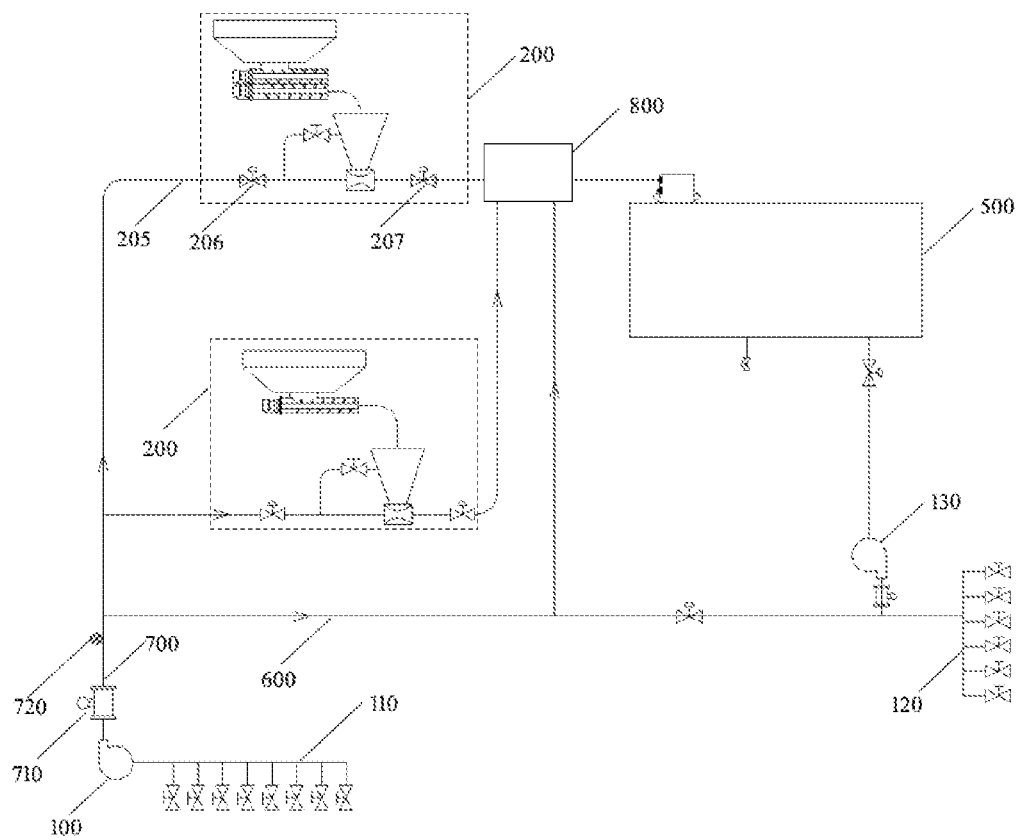

FIGS. 12 and 12A are layout diagrams of a mixing system including a plurality of mixing apparatuses provided by some embodiments of the present disclosure.

For example, as shown in FIG. 12, the mixing system includes a plurality of mixing apparatuses 200 (only two of them are shown as an example in FIG. 12), and the mixing system further includes a main mixing tank 500, a main liquid branch pipeline 600, and a manifold 700 communicating with the main pump 100.

For example, as shown in FIG. 12, the liquid inlet end of the main pipeline 210 of each mixing apparatus 200 is communicated with the main pump 100 (for example, the main pump 100 is a suction pump) through the manifold 700. The plurality of mixing apparatuses 200 are arranged in parallel between the manifold 700 and the main mixing tank 500, and the main mixing tank 500 is respectively connected, in series, with the plurality of mixing apparatuses 200 and the main liquid branch pipeline 600. The main liquid branch pipeline 600 is arranged in parallel with the plurality of mixing apparatuses 200, and the main liquid branch pipeline 600 is arranged between the manifold 700 and the main mixing tank 500. A liquid inlet end of the main liquid branch pipeline 600 is communicated with the manifold 700 to obtain the main liquid which is supplied by the main pump 100 and flows through the manifold 700. The main liquid branch pipeline 600 includes at least one main liquid branch outlet end 610, and each main liquid branch outlet end 610 is merged with at least part of an intermediate pipeline 800 for communicating the shearing-mixing output port 234 of at least one of the plurality of mixing apparatuses 200 and the main mixing tank 500 (for example, an input end of the main mixing tank 500).

Therefore, according to the above embodiments of the present disclosure, the liquid in the branch where at least two mixing apparatuses are located is fully mixed with another stream of liquid directly supplied by the suction pump, and then enters the main mixing tank, which improves the mixing efficiency and also the mixing effect.

In some examples, each mixing apparatus of the above embodiments of the present disclosure has a storage device and a conveyor. Therefore, different kinds of powder can also be added to different mixing apparatuses, respectively, and each stream of liquid is mixed with another stream of liquid supplied by the suction pump and then enters the main mixing tank together, which can not only realize a staged mixing of different categories, but can also improve the mixing efficiency.

In some other examples, each of the mixing apparatuses in the above embodiments of the present disclosure has a storage device and a conveyor, and some or all of these mixing apparatuses can use the same kind of powder. The present disclosure is not limited to this but can be determined according to actual situations without particularly described here. In some other embodiments, each mixing apparatus in the mixing system includes a conveyor, a premixing device and a shearing-mixing device, and the mixing system further includes a storage device which is shared by the plurality of mixing apparatuses. For example, the conveyor of each mixing apparatus obtains the corresponding powder from the storage device and delivers the powder to the corresponding premixing device. This is only an example but is not a limitation of the present disclosure, and will not be particularly described here.

In some embodiments of the present disclosure, the liquid flowing through the main liquid branch pipe 600 and the liquid flowing through the plurality of mixing apparatuses 200 are merged in the intermediate pipeline 800 to obtain merged liquid, and the intermediate pipeline 800 can also be communicated with the main mixing tank 500 through a diffusion mixer, that is, the merged liquid enters the diffusion mixer and then enters the main mixing tank.

For example, in the example of FIG. 12, a protruding part of an upper surface of the main mixing tank 500 is a diffusion mixer, and the merged liquid enters the inside of the main mixing tank 500 after passing through the diffusion mixer. For example, at least part of the diffusion mixer may be inserted into the main mixing tank, and an outlet of the diffusion mixer directly enters the main mixing tank. This is merely an example and is not a limitation of the present disclosure.

It should be noted that FIG. 12 is only a simple and intuitive schematic drawing for readers to understand, and is not a limitation of the embodiments of the present disclosure. For example, the intermediate pipeline 800 shown in FIG. 12 is only a schematic illustration, which shows a pipeline between the shearing-mixing output port of the mixing apparatus 200 and the main mixing tank 500. Moreover, the merging arrangement of the shearing-mixing output ports of the plurality of mixing apparatuses 200 and the main liquid branch outlet end 610 of the main liquid branch pipeline 600 shown in FIG. 12 is not limited to a direct intersection among the mixing apparatus 200, the main liquid branch pipeline 600 and the main mixing tank 500 in a same pipeline position as shown intuitively in FIG. 12, which mainly means that at least every two of these three can be arbitrarily intersected in any part of the intermediate pipeline. The following FIGS. 13 to 15 respectively show schematic diagrams of specific embodiments of the present disclosure, and in these embodiments, the mixing system of the present disclosure is illustrated with specific exemplary designs.

The intermediate pipeline 800 in some embodiments of the present disclosure may all be pipelines outside the main mixing tank, and the intermediate pipeline 800 may also be partly outside and partly inside the main mixing tank. An input end of the main mixing tank of the present disclosure may refer to a position (for example, a position corresponding to an outlet of the diffusion mixer) where the main mixing tank actually obtains liquid output from, for example, the diffusion mixer, and is not limited to an opening on a shell surface of the main mixing tank, which means that the input end of the main mixing tank may also be located inside the main mixing tank.

It should be noted that in the technical solution of the mixing system in the embodiment of the present disclosure, the mixing system is divided into or defined as elements or objects (such as intermediate pipelines, the input end of the main mixing tank, etc.) for performing corresponding functions. It would be definite for those skilled in the art that the functions performed by respective elements or objects can be performed under the above-mentioned division and may also be performed under other division modes, which does not limit the protection scope of the present disclosure. Moreover, the meanings and functions of the elements or objects in the above-mentioned embodiments of the present disclosure are not limited by their names, and cannot be explained in an idealized or extremely formal sense.

It should be noted that, in the embodiments of the present disclosure, the specific structure, construction and technical effects of the mixing apparatus 200 shown in FIG. 12 may be referred to the description of the mixing apparatus 200 in any of the above embodiments, and will not be repeated here.

For example, as shown in FIG. 12A, the mixing system further includes a discharge pump 130. An output end of the main mixing tank 500 is connected to an input end of the discharge pump 130, and an output end of the discharge pump 130 is connected to a discharge header 120, so that the discharge pump 130 can discharge the mixed fluid (such as fracturing fluid) to a downstream device through the discharge header 120.

For example, as shown in FIG. 12A, the main pump 100 is a suction pump, and a suction header 110 is connected to an input end of the suction pump. The suction pump sucks in the main liquid through the suction header 110.

In some examples, a tank liquid level monitor (not shown) is installed inside the main mixing tank 500 to monitor a liquid level of the main mixing tank 500.

For example, as shown in FIG. 12A, the manifold 700 is provided with at least one selected from the group consisting of a flowmeter 710 and a pressure sensor 720.

Figure 13:
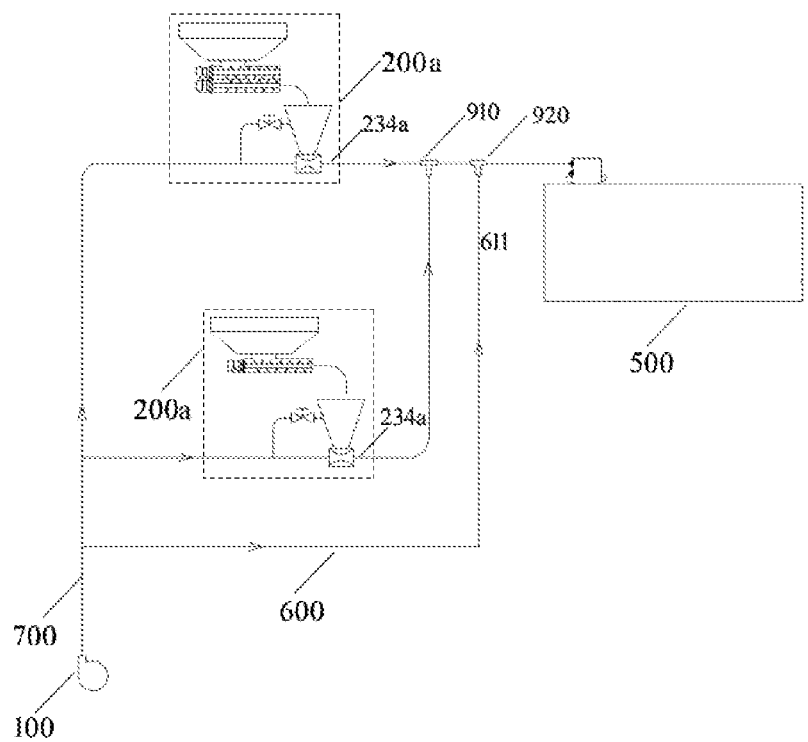
FIG. 13 is a layout diagram illustrating a two-stage merging arrangement of a branch where a plurality of mixing apparatuses is located and a liquid supply branch of a suction pump in a mixing system provided by some embodiments of the present disclosure.

FIG. 13 is a layout diagram of two-stage merging arrangement of a branch where a plurality of mixing apparatuses are located and a liquid supply branch of a suction pump in a mixing system provided by some embodiments of the present disclosure.

For example, as shown in FIG. 13, the mixing system further includes a first merging device 910 (only one three-way mixer is shown in FIG. 13 as an example of the first merging device) and a second merging device 920 (only one three-way mixer is shown in FIG. 13 as an example of the second merging device). The above-mentioned at least one main liquid branch outlet end 610 includes a first main liquid branch outlet end 611. The first main liquid branch outlet end 611 is a main liquid branch outlet end from the main liquid branch pipeline 600, and one first main liquid branch outlet end 611 corresponds to one branch stream from the main liquid branch pipeline 600. The plurality of mixing apparatuses 200 include two or more first mixing apparatuses 200a. The shearing-mixing output port 234a of each of the two or more first mixing apparatuses 200a is communicated with one of different input ends of the first merging device 910. For example, an output end of the first merging device 910 and the first main liquid branch outlet end 611 are communicated with different input ends of the second merging device 920 respectively, and an output end of the second merging device 920 is communicated with the input end of the main mixing tank 500.

In some examples, at least one of the first merging device 910 and the second merging device 920 includes at least one selected from the group consisted of a three-way mixer, a static mixer, a jet mixer, a tubular cyclone mixer, a diffusion mixer, a mixing tank, and a coil-pipe typed mixing device. This is merely an example and is not a limitation of the present disclosure.

For example, in the example shown in FIG. 13, the two streams of liquid output from the two first mixing apparatuses 200a are merged and mixed, firstly, at the first merging device 910, and the mixed liquid is merged and mixed, again, with the main liquid flowing through the main liquid branch pipeline 600, and then the secondary merged liquid enters the main mixing tank 500.

For example, in the example of FIG. 13, the output end of the second merging device 920 is communicated with the input end of the main mixing tank 500 through a diffusion mixer or a tubular cyclone mixer.

Figure 14:
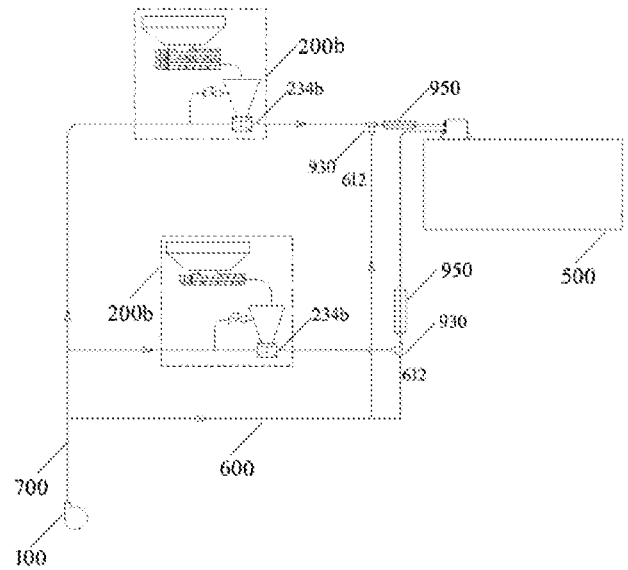
FIG. 14 is a layout diagram of a one-stage merging arrangement of a branch where a plurality of mixing apparatus is located and a liquid supply branch of a suction pump in a mixing system provided by some embodiments of the present disclosure.

FIG. 14 is a layout diagram of a one-stage merging arrangement of a branch where a plurality of mixing apparatuses are located and a liquid supply branch of a suction pump in a mixing system provided by some embodiments of the present disclosure.

For example, as shown in FIG. 14, the mixing system further includes at least one third merging device 930 (in the figure, two third merging devices are shown as an example, and one three-way mixer is shown as an example of one first merging device). The at least one main liquid branch outlet end 610 includes at least one second main liquid branch outlet end 612. The second main liquid branch outlet end 612 is a main liquid branch outlet end from the main liquid branch pipeline 600, and one second main liquid branch outlet end 611 corresponds to one branch stream from the main liquid branch pipeline 600. The plurality of mixing apparatuses 200 include at least one second mixing apparatus 200b (two second mixing apparatuses are shown in the figure as an example). The at least one second main liquid branch outlet end 612 is arranged in one-to-one correspondence with the at least one third merging device 930, and the at least one third merging device 930 is arranged in one-to-one correspondence with the at least one second mixing apparatus 200b. The shearing-mixing output port 234b of each second mixing apparatus 200b is communicated with one of different input ends of the corresponding third merging device 930, and an output end of each third merging device 930 is communicated with the input end of the main mixing tank 500.

In some examples, the number of the at least one second main liquid branch outlet end 612 is two or more (for example, two second main liquid branch outlet ends are shown in FIG. 14), the number of the at least one second mixing apparatus 200*b* is two or more (for example, two second mixing apparatuses are shown in FIG. 14), and the number of the at least one third merging device 930 is two or more (for example, two third merging devices are shown in FIG. 14). Therefore, the two or more second main liquid branch outlet ends 612 are arranged in one-to-one correspondence with the two or more third merging devices 930, and the two or more third merging devices 930 are arranged in one-to-one correspondence with the two or more second mixing apparatuses 200*b*.

In some examples, the third merging device 930 includes at least one selected from the group consisted of a three-way mixer, a static mixer, a jet mixer, a tubular cyclone mixer, a diffusion mixer, a mixing tank, and a coil-pipe typed mixing device. This is merely an example and is not a limitation of the present disclosure.

For example, as shown in FIG. 14, an output end of each third merging device 930 is communicated with the input end of the main mixing tank 500 through a static mixer 950. This is merely an example and is not a limitation of the present disclosure.

Figure 15:
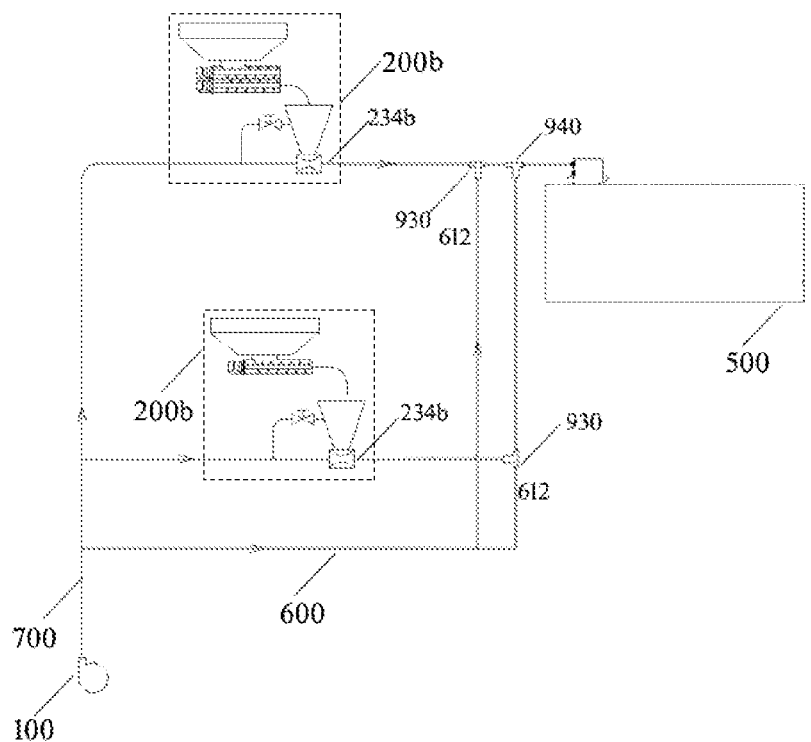
FIGS. 15 and 16 are layout diagrams of a two-stage merging arrangement of a branch where a plurality of mixing apparatus is located and a liquid supply branch of a suction pump in a mixing system provided by some other embodiments of the present disclosure.
Figure 16:
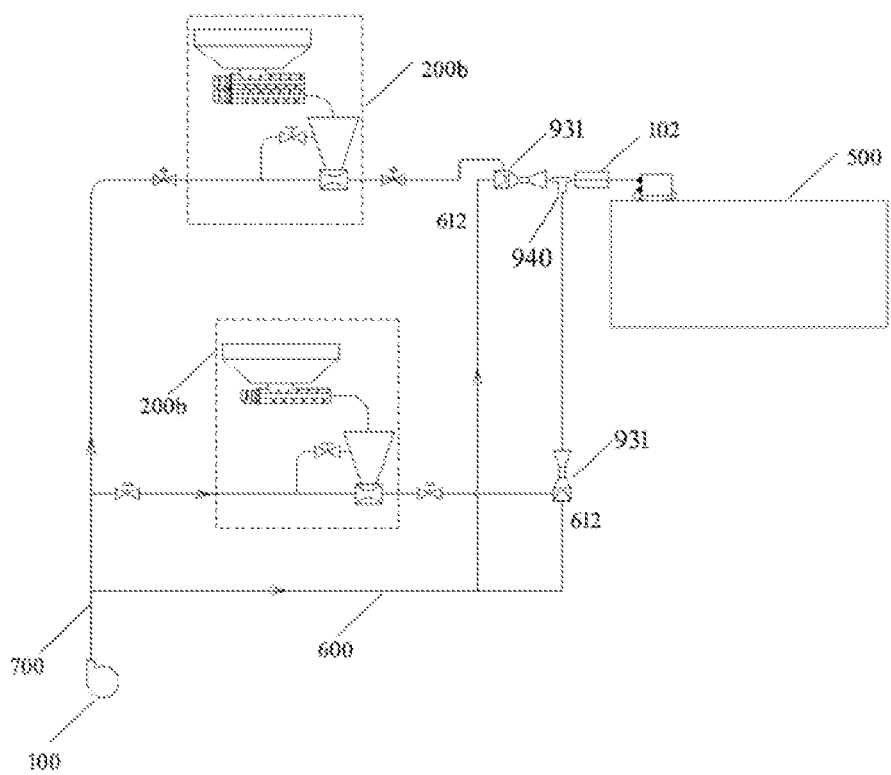

FIGS. 15 and 16 are layout diagrams of a two-stage merging arrangement of a branch where a plurality of mixing apparatuses are located and a liquid supply branch of a suction pump in a mixing system provided by some other embodiments of the present disclosure.

For example, as shown in FIG. 15, the mixing system further includes a fourth merging device 940 (one fourth merging device is shown in the figure as an example, and one three-way mixer is shown in the figure as an example of the one fourth merging device). The at least one third merging device 930 includes two or more third merging devices 930 (two third merging devices are shown in the figure as an example). An output end of each third merging device 930 is communicated with one of different input ends of the fourth merging device 940, and an output end of the fourth merging device 940 is communicated with the input end of the main mixing tank 500. In the example of FIG. 15, related contents of the second main liquid branch outlet end 612 and the third merging device 930 included in the mixing system can be referred to the example of FIG. 14, which will not be repeatedly described here.

In some examples, the fourth merging device 940 includes at least one selected from the group consisted of a three-way mixer, a static mixer, a jet mixer, a tubular cyclone mixer, a diffusion mixer, a mixing tank, and a coil-pipe typed mixing device. This is merely an example and is not a limitation of the present disclosure.

For example, in the example of FIG. 15, the third merging device 930 includes at least one selected from the group consisted of a three-way mixer (shown in FIG. 15), a static mixer, a jet mixer (such as the jet mixer shown in FIG. 16 below), a tubular cyclone mixer, a diffusion mixer, a mixing tank, and a coil-pipe typed mixing device. This is merely an example and is not a limitation of the present disclosure.

For example, in the example of FIG. 15, the output end of the fourth merging device 940 is communicated with the input end of the main mixing tank 500 through a diffusion mixer or a tubular cyclone mixer.

For example, in the example of FIG. 15, a flow control valve (not shown) may be provided on the branch pipeline corresponding to each second main liquid branch outlet end 612 to adjust different amounts of main liquid to be mixed with the mixed liquid outputted from the output port of the second mixing apparatus 200*b*.

For example, the example of FIG. 16 can be obtained by using a jet mixer 931 as the third merging device 930 in the example of FIG. 15. In the example of FIG. 16, a drainage input end of each jet mixer 931 is communicated with the output port of the second mixing apparatus 200*b*, a spraying input end of the jet mixer 931 is communicated with the second main liquid branch outlet end 612 of the main liquid branch pipeline 600, and a spraying output end of the jet mixer 931 is communicated with an input end of the fourth merging device 940.

In some examples, a flow area of the jet mixer 931 is fixed.

In some other examples, a flow area of the jet mixer 931 is variable. For example, the flow rate can be adjusted by adjusting the flow area of the jet mixer 931, and the mixing of two streams of liquid within a certain flow rate range can be completed, thus realizing variable flow mixing, simplifying the apparatus structure, and improving a turbulent mixing effect of liquid by using the Venturi principle.

It should be noted that, a pipeline diameter of the spraying input end of the jet mixer 931 (that is, the stream of liquid corresponding to the main liquid branch pipeline 600) is obviously changed, so that the flow velocity of the liquid is increased, an injection effect is achieved, the Venturi effect is occurred, and the mixing with the stream of concentrated liquid corresponding to the drainage input end is facilitated in a better way.

For example, in the example of FIG. 16, the output end of each fourth merging device 940 is connected to the input end of the main mixing tank 500 through a static mixer 102.

It should also be noted that the embodiments of the present disclosure may be any combination of the examples in FIGS. 13 to 16. For example, at least a part of the plurality of mixing apparatuses may adopt the merging method of the first mixing apparatus 200*a* in the example of FIG. 13, and the other parts of the plurality of mixing apparatuses may adopt the merging method of the second mixing apparatus 200*b* in the example of FIGS. 14 to 16.

In some examples, when the mixing system is running, parameters such as the operation flow and the proportion of power material are usually configured. The discharge outlet of the main pump 100 is provided with a pressure sensor 710 and a flowmeter 720. A real-time flow is measured by the flowmeter 720, and a pressure at the discharge outlet of the pump is detected by the pressure sensor 710. Therefore, an inlet pressure of the mixing system and an inlet pressure of each merging device can be guaranteed, that is, the inlet pressures of these devices can be guaranteed to be within a preset range respectively.

For example, in the example of FIG. 16, for the two jet mixers 931 arranged in one-to-one correspondence with two second mixing apparatuses 200*b* of the mixing system, whether they are turned on or not can be adjusted according to the flow rate. For example, they may be turned on simultaneously or only one of them may be turned on.

For example, when one of the second mixing apparatuses 200*b* is in operation, only one corresponding jet mixer 931 is turned on, the input end of the other jet mixer 931 is closed by an actuator with linear motion or rotation angle, and an inflow of the jet mixer 931 corresponding to the second mixing apparatus 200*b* in operation is adjusted by a valve with linear motion or rotation angle, so as to improve the mixing effect.

For example, the jet mixer 931 corresponding to the other second mixing apparatus 200*b* is replenished with liquid when the flow rate of liquid needs to be increased, so that the liquid flowing through the two jet mixers 931 passes through the static mixer 102 to the main mixing tank 500.

After that, a liquid level is monitored by the tank liquid level monitor in the main mixing tank 500, and a feedback signal is sent to the control system, which takes corresponding control measures according to a preset liquid level. For example, the preset liquid level is set as 60%, and the opening degree of a suction pump connecting manifold is increased to increase the liquid inflow in the case where the actual liquid level of the main mixing tank 500 is 50%. For example, in the case where the actual liquid level of the tank drops to an alarm value, the rotation speed or opening degree of the discharge pump is reduced to reduce the discharge amount and avoid an empty liquid level. For example, in the case where the liquid level rises to 70% (that is, slightly exceeds the preset liquid level of 60%), the liquid supply of the suction pump is reduced and the discharge amount of the discharge pump is increased. In the case where the actual liquid level of the tank rises to an alarm value, the mixing system will shut down the suction pump and other components, and stop feeding the liquid and powder.

For example, as shown in FIG. 12A, each mixing apparatus further includes a flow control valve 206 and a flow control valve 207. The flow control valve 206 is arranged on the main pipeline (for example, the main pipeline 205 in FIG. 12A, which is the main pipeline 210 in FIG. 1) and the flow control valve 206 is located at one side close to the input end of the main pipeline 205. The flow control valve 207 is arranged between the outlet port of the mixing apparatus 200 and the intermediate pipeline 800 (for example, between the outlet port of the mixing apparatus 200 and the input end of the first merging device, or between the outlet port of the mixing apparatus 200 and the input end of the third merging device).

Therefore, in the above embodiment of the present disclosure, valves are provided at the liquid inlet and the liquid outlet of the mixing apparatus 200, and the specific functions of the valves are described as below. In a practical application, the mixing apparatus is often in an opened state, and the liquid is liable to overflow from a dry powder adding port of the mixing apparatus in the case where there is a vertical pipe or a tank with high liquid level for the mixing apparatus; the control system obtains the pressure at a liquid supply end of the mixing apparatus through the pressure sensor and obtains one or more signal selected from the group consisted of an opening degree of a hydraulic system of the mixing apparatus, a power supply frequency of the electric motor and a rotating speed of the electric motor through other sensors, so as to obtain a rotating speed of the mixing apparatus. For example, in the case where the shearing-mixing device of the mixing apparatus needs to be stopped, the conveyor stops adding material at first, and the rotating speed of the mixing apparatus also decreases at the same time. The valves at both sides of the mixing apparatus are closed to prevent the liquid from overflowing from the mixing apparatus in the case where the rotating speed of the mixing apparatus is reduced to a preset speed. The valves at both sides of the mixing apparatus may be arranged in a preset order, so as to avoid idling of the mixing apparatus or avoid overflow of liquid. The control system sends instructions to the mixing apparatus and the valves at both sides thereof to slow down or stop the mixing apparatus in the case where a pressure of the pipeline preceding the mixing apparatus is lower than a preset value. The valves at both sides of the mixing apparatus are controlled in a linkage manner according to the above process to avoid overflow of fluid. This is merely an example and is not a limitation of the present disclosure.

It should be noted that, the mixing system of any of the above embodiments of the present disclosure can be used not only for fracturing fluid, but also for other purposes, as long as it relates to the mixing between powder and base fluid, all of which are within the scope of protection of the present disclosure without exhaustively listed or particularly detailed here.

At least one embodiment of the present disclosure also provides a mixing system, which includes a suction pump, a manifold, a main mixing tank, a main liquid branch pipeline and a plurality of mixing apparatuses. The manifold is communicated with the suction pump. A liquid inlet end of the main pipeline of each of the plurality of mixing apparatuses is communicated with the suction pump through the manifold. The plurality of mixing apparatuses are arranged in parallel between the manifold and the main mixing tank, and the main mixing tank is connected in series with the plurality of mixing apparatuses and the main liquid branch pipeline, respectively. The main liquid branch pipeline is arranged in parallel with the plurality of mixing apparatuses, and the main liquid branch pipeline is arranged between the manifold and the main mixing tank. A liquid inlet end of the main liquid branch pipeline is communicated with the manifold to obtain the main liquid which is supplied by the suction pump and flows through the manifold. The main liquid branch pipeline includes at least one main liquid branch outlet end, and each of the at least one main liquid branch outlet end is merged with at least part of an intermediate pipeline communicating the main mixing tank and the output port of at least one mixing apparatus of the plurality of mixing apparatuses. Therefore, according to the embodiments of the present disclosure, the liquid in the branch where at least two mixing apparatuses are located is fully mixed with another stream of liquid directly supplied by the suction pump, and then enters the main mixing tank, which increases the overall flow, improves the mixing efficiency and also the mixing effect. For example, the mixing system of this embodiment may be the mixing system shown in FIG. 12. For another example, a plurality of mixing apparatuses in the mixing system of this embodiment includes, but is not limited to, the above mixing apparatus 200.

It should be noted that in the above embodiments of the present disclosure, the first mixing apparatus and the second mixing apparatus are intended to distinguish two mixing apparatuses respectively applied in different embodiments, rather than limiting the two mixing apparatuses per se. Similarly, in the above embodiments of the present disclosure, the first merging device, the second merging device, the third merging device and the fourth merging device are intended to distinguish four merging devices respectively applied in different embodiments, rather than limiting the four merging devices per se.

Some embodiments of the present disclosure also provide a mixing method based on a mixing system, and the mixing method includes one or more of the following processes (or steps):

(1) starting a main pump 100 and supplying main liquid to a mixing apparatus 200 through a liquid inlet end of the main pipeline 210;

(2) obtaining powder and obtaining the main liquid from the main pipeline 210, by a premixing device 220;

(3) premixing the main liquid and the powder to obtain premixed liquid, by the premixing device 220;

(4) obtaining the premixed liquid from an output end of the premixing device 220, and obtaining the main liquid through a first shearing-mixing liquid inlet 231, by a shearing-mixing device 230;

(5) obtaining mixed liquid through a shearing-mixing process and delivering the mixed liquid, by the shearing-mixing device 230.

It should be noted that, in the embodiments of the present disclosure, the specific processes and technical effects of the mixing method based on the mixing system can refer to the description of the mixing system above, and will not be repeated here again.

The following statements should be noted:

(1) The accompanying drawings related to the embodiments of the present disclosure involve only the structures in connection with the embodiments of the present disclosure, and other structures can be referred to common designs.

(2) In case of no conflict, the embodiments or the features in the embodiments of the present disclosure can be combined to obtain new embodiments.

The foregoing is merely exemplary embodiments of the disclosure, but is not used to limit the protection scope of the disclosure. The protection scope of the disclosure shall be defined by the attached claims

What is claimed is:

1. A mixing system, comprising a main pump and a mixing apparatus, the mixing apparatus comprising a main pipeline, a premixing device and a shearing-mixing device, wherein the main pipeline has a liquid inlet end communicated with the main pump and is configured to convey main liquid, and the main pipeline comprises a first liquid outlet end and a second liquid outlet end;

the premixing device has an input end communicated with the first liquid outlet end of the main pipeline and is configured to premix the main liquid as obtained with powder as obtained to obtain premixed liquid;

the shearing-mixing device is communicated with an output end of the premixing device to obtain the premixed liquid, and the shearing-mixing device is provided with a first shearing-mixing liquid inlet communicated with the second liquid outlet end of the main pipeline to obtain the main liquid, so that mixed liquid is obtained by a shearing-mixing process;

the mixing apparatus further comprises a control system, and the main pipeline is provided with a first pressure sensor configured to monitor a pressure of the main pipeline; and the control system is signally connected to the first pressure sensor and is configured to obtain a pressure signal of the first pressure sensor.

2. The mixing system according to claim 1, wherein the shearing-mixing device further comprises an impeller shearing assembly, and the impeller shearing assembly comprises a rotating shaft and at least one shearing impeller driven by the rotating shaft.

3. The mixing system according to claim 2, wherein a liquid outlet direction of the second liquid outlet end is located on a plane perpendicular to an axial direction of the rotating shaft.

4. The mixing system according to claim 3, wherein the shearing-mixing device comprises a second shearing-mixing liquid inlet configured to obtain the premixed liquid, and a liquid inlet direction of the second shearing-mixing liquid inlet is parallel to the axial direction of the rotating shaft; and a liquid inlet direction of the first shearing-mixing liquid inlet is located on the plane perpendicular to the axial direction of the rotating shaft.

5. The mixing system according to claim 4, wherein one or more first shearing-mixing liquid inlets are provided.

6. The mixing system according to claim 2, wherein a liquid outlet direction of the second liquid outlet end is parallel to an axial direction of the rotating shaft.

7. The mixing system according to claim 6, wherein the first shearing-mixing liquid inlet is communicated with an output end of the premixing device, and a liquid inlet direction of the first shearing-mixing liquid inlet is parallel to the axial direction of the rotating shaft.

8. The mixing system according to claim 2, wherein the at least one shearing impeller comprises a first shearing impeller and a second shearing impeller, and the first shearing impeller and the second shearing impeller are arranged coaxially with the rotating shaft, respectively.

9. The mixing system according to claim 8, wherein a periphery of the first shearing impeller is provided with a first stator, and the first stator is provided with an opening; and/or, a periphery of the second shearing impeller is provided with a second stator, and the second stator is provided with an opening.

10. The mixing system according to claim 1, wherein the shearing-mixing device further comprises an impeller shearing assembly of conveying type, which has an output pressure greater than 0.04 Mpa.

11. The mixing system according to claim 1, wherein the main pipeline is provided with a first flowmeter, and the control system is further signally connected to the first flowmeter and is configured to obtain a flow signal of the first flowmeter.

12. The mixing system according to claim 1, wherein the input end of the premixing device comprises one or more premixing inlets, and the main pipeline is provided with a first flow control valve at one side close to the input end of the premixing device.

13. The mixing system according to claim 1, wherein the mixing apparatus further comprises a mixed-liquid conveying pipeline, a remixing device and a branch pipeline, an input end of the mixed-liquid conveying pipeline is communicated with a shearing-mixing output port of the shearing-mixing device to convey mixed liquid output from the shearing-mixing output port, an output end of the mixed-liquid conveying pipeline is communicated with an input end of the remixing device, and an input end of the branch pipeline is communicated with a third liquid outlet end of the main pipeline, and an output end of the branch pipeline is communicated with the input end of the remixing device.

14. The mixing system according to claim 13, wherein the branch pipeline is provided with a second flow control valve.

15. The mixing system according to claim 13, wherein the mixing apparatus further comprises a spraying-mixing device, and the spraying-mixing device comprises a spraying input end, a drainage input end and a spraying output end, the spraying input end is communicated with the output end of the branch pipeline, and the spraying output end is communicated with the input end of the remixing device, so that the output end of the branch pipeline is communicated with the input end of the remixing device, the drainage input end is communicated with the output end of the mixed-liquid conveying pipeline, and the spraying output end is communicated with the input end of the remixing device, so that the output end of the mixed-liquid conveying pipeline is communicated with the input end of the remixing device, and the spraying input end is configured to obtain the main liquid, and the drainage input end is configured to obtain the mixed liquid, so that the mixed liquid and the main liquid are mixed inside the spraying-mixing device.

16. A mixing system, comprising a main pump and at least one mixing apparatus, each of the at least one mixing apparatus comprising a main pipeline, a premixing device and a shearing-mixing device, wherein the main pipeline has a liquid inlet end communicated with the main pump and is configured to convey main liquid, and the main pipeline comprises a first liquid outlet end and a second liquid outlet end;

the premixing device has an input end communicated with the first liquid outlet end of the main pipeline and is configured to premix the main liquid as obtained with powder as obtained to obtain premixed liquid;

the shearing-mixing device is communicated with an output end of the premixing device to obtain the premixed liquid, and the shearing-mixing device is provided with a first shearing-mixing liquid inlet communicated with the second liquid outlet end of the main pipeline to obtain the main liquid, so that mixed liquid is obtained by a shearing-mixing process;

the mixing system further comprises a main mixing tank, a main liquid branch pipeline, and a manifold communicated with the main pump;

the at least one mixing apparatus comprises a plurality of mixing apparatuses, and the liquid inlet end of the main pipeline of each of the plurality of mixing apparatuses is communicated with the main pump through the manifold;

the plurality of mixing apparatuses are arranged in parallel between the manifold and the main mixing tank, and the main mixing tank is connected in series with the plurality of mixing apparatuses and the main liquid branch pipeline, respectively;

the main liquid branch pipeline is arranged in parallel with the plurality of mixing apparatuses, and the main liquid branch pipeline is arranged between the manifold and the main mixing tank, and a liquid inlet end of the main liquid branch pipeline is communicated with the manifold to obtain the main liquid which is supplied by the main pump and flows through the manifold; and the main liquid branch pipeline comprises at least one main liquid branch outlet end, and each of the at least one main liquid branch outlet end is merged with at least part of an intermediate pipeline communicating the main mixing tank and shearing-mixing output ports of at least one mixing apparatus of the plurality of mixing apparatuses.

17. The mixing system according to claim 16, further comprising a first merging device and a second merging device, wherein the at least one main liquid branch outlet end comprises a first main liquid branch outlet end, and the plurality of mixing apparatuses comprise two or more first mixing apparatuses, and the shearing-mixing output ports of the two or more first mixing apparatuses are communicated with different input ends of the first merging device, respectively, an output end of the first merging device and the first main liquid branch outlet end are communicated with different input ends of the second merging device, respectively, and an output end of the second merging device is communicated with an input end of the main mixing tank.

18. The mixing system according to claim 16, further comprising at least one third merging device, wherein the at least one main liquid branch outlet end comprises at least one second main liquid branch outlet end, and the plurality of mixing apparatuses comprise at least one second mixing apparatus, the at least one second main liquid branch outlet end is arranged in one-to-one correspondence with the at least one third merging device, and the at least one third merging device is arranged in one-to-one correspondence with the at least one second mixing apparatus, and the shearing-mixing output port of each of the at least one second mixing apparatus is communicated with one of different input ends of a corresponding third merging device, and an output end of each of the at least one third merging device is communicated with the input end of the main mixing tank.

19. The mixing system according to claim 18, further comprising a fourth merging device, wherein the at least one third merging device comprises two or more third merging devices, an output end of each of the two or more third merging devices is communicated with one of different input ends of the fourth merging device, and an output end of the fourth merging device is communicated with the input end of the main mixing tank.

\* \* \* \* \*